(12) United States Patent
Lee et al.

(10) Patent No.: US 7,861,922 B2
(45) Date of Patent: Jan. 4, 2011

(54) METHOD, APPARATUS AND SYSTEM FOR PROVIDING FINANCIAL SERVICE BY USING MOBILE STATION IN PACKET DATA SYSTEM

(75) Inventors: Geun-Myeon Lee, Yongin-si (KR); Yun-Sang Park, Suwon-si (KR); Sun-Ju Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 657 days.

(21) Appl. No.: 11/836,589

(22) Filed: Aug. 9, 2007

(65) Prior Publication Data
US 2008/0059372 A1    Mar. 6, 2008

(30) Foreign Application Priority Data
Aug. 9, 2006    (KR) .................. 10-2006-0075416

(51) Int. Cl.
*G07F 19/00* (2006.01)
(52) U.S. Cl. ...................................... 235/379
(58) Field of Classification Search .................. 235/379, 235/382, 462.01; 705/35
See application file for complete search history.

(56) References Cited

U.S. PATENT DOCUMENTS 7,159,778 B1 *   1/2007   Kochevar et al. ....... 235/462.01
7,739,190 B2 *   6/2010   Shin et al. .................... 705/39

FOREIGN PATENT DOCUMENTS

| JP | 2002-064597 | 2/2002 |
| JP | 2002-099862 | 4/2002 |
| KR | 1020010092065 | 10/2001 |
| KR | 1020050064618 | 6/2005 |

* cited by examiner

*Primary Examiner*—Seung H Lee
(74) *Attorney, Agent, or Firm*—The Farrell Law Firm, LLP

(57) ABSTRACT

Disclosed is a method, apparatus and system for providing a financial service through a mobile station in a mobile communication network. The system includes the mobile station for reading a barcode, transmitting user authentication data and the barcode, receiving passbook data, and storing and managing the passbook data; the mobile communication network for receiving the user authentication data and the barcode to thereby provide barcode information to a bank server, determining whether to approve the service; the bank server for managing the passbook data, allocating a specific barcode to each automatic machine, providing the location information of the automatic machine, corresponding to the barcode, and providing the mobile station with a banking service; and the automatic machine for receiving the barcode and outputting the received barcode, and providing the banking service through the bank server when the service is approved.

22 Claims, 11 Drawing Sheets

METHOD, APPARATUS AND SYSTEM FOR PROVIDING FINANCIAL SERVICE BY USING MOBILE STATION IN PACKET DATA SYSTEM

PRIORITY

This application claims priority to an application entitled "Method, Apparatus and System for Providing Financial Service by Using Mobile Station in Packet Data System" filed in the Korean Industrial Property Office on Aug. 9, 2006 and assigned Serial No. 2006-0075416, the contents of which are hereby incorporated by reference.

BACKGROUND OF THE INVENTION

1. Field of the Invention

The present invention relates to a method, apparatus and system for providing a financial service by using a communication network, and more particularly to a method, apparatus and system for providing a financial service through a mobile station in a packet data system.

2. Description of the Related Art

With the advent of additional services using an intelligent network, the rapid development of various network technologies, and the advance of computer and software technologies, a variety of financial services, such as phone banking, home banking, firm banking, etc., have recently been provided. Also, many companies are taking positive action to ensure clients by providing banking services through the Internet which is an information communication network transcending regional and national boundaries. The Internet has been initially used for academic and research purposes, but has been extended to personal and business applications according to many commercialization efforts encouraged by its various functionalities and high availability. A typical example of such applications includes the Internet banking service for handling banking over the Internet.

FIG. 1 illustrates the structure of a conventional communication network for providing a financial service.

Referring to FIG. 1, in a conventional process in which a user 101 is provided with a financial service over a communication network, the user 101 performs various financial transactions, such as a deposit/withdrawal transaction, an account transfer transaction, etc., by inserting a bank card 103 in the form of a magnetic or smart card into an automatic machine 105, such as an Automatic Teller Machine/Cash Dispenser (ATM/CD), installed in each bank branch or a public place. Financial transaction histories performed through the ATM/CD 105 are delivered to a corresponding bank server 107, where they are recorded as financial transaction information of the relevant user 101.

The user may also access the Internet N1 via a PC 109 and then use the Internet banking service provided through the bank server 107. Financial transaction histories that the user 101 performs in the Internet banking service are delivered to the bank server 107, where they are recorded as financial transaction information. Also, the user 101 can check financial transaction histories processed through the ATM/CD 105 or Internet banking service in a passbook update scheme in which a passbook 111 issued by the bank is inserted into a passbook update machine 113 and corresponding financial transaction information is printed on the passbook 111.

In fact, the aforementioned ATM/CD or Internet banking service provides the user 101 with many conveniences and benefits, but the conventional financial service over a communication network has no direct connection between an online service and an offline service occurring in a bank branch. Thus, not only are additional actions required, such as passbook update, but also the user 101 may be inconvenienced, for example, the user 101 must insert a bank card when using the ATM/CD. Moreover, when the user 101 transacts with a number of banks, he/she must manage a plurality of passbooks and bank cards, each at which is opened for an account of each bank, and thus suffers much inconvenience in using the conventional financial service.

Therefore, there is a need for a way to provide a user with a more convenient financial service while enabling a connection between conventional online and offline financial services.

SUMMARY OF THE INVENTION

Accordingly, the present invention has been made to solve at least the above-mentioned problems occurring in the prior art, and the present invention provides a method, apparatus and system for providing a financial service by using a mobile station in a high-speed packet data system.

Further, the present invention provides a method, apparatus and system for providing a financial service over a mobile communication network communicating with an ATM/CD of a bank network.

Further, the present invention provides a mobile station, method and system for providing a convenient financial service by using an electronic passbook.

In accordance with an aspect of the present invention, there is provided a system for providing a financial service over a mobile communication network that can provide packet data, the system includes a mobile station for reading a barcode, transmitting user authentication data and the read barcode to the mobile communication network, receiving passbook data from the mobile communication network, and storing and managing the received passbook data; the mobile communication network for receiving the user authentication data and the barcode in a packet data format from the mobile station to thereby provide barcode information to a bank server, determining whether to approve the service by receiving location information of an automatic machine from the bank server, and providing the automatic machine and the bank server with a result of the determination; the bank server for managing the passbook data of a user, allocating a specific barcode to each automatic machine, providing the location information of the automatic machine, corresponding to the barcode, when receiving the barcode information from the mobile communication network, and providing the mobile station with a banking service and a result thereof; and the automatic machine for receiving the barcode from the bank server and outputting the received barcode when the banking service through the mobile terminal is requested, and providing the banking service through the bank server when the service is approved.

In accordance with another aspect of the present invention, there is provided a method of providing a financial service over a mobile communication network that can provide packet data, the method includes transmitting a request for barcode information from a bank terminal to a bank server, and receiving and displaying the barcode information by the bank terminal when a banking service through a barcode is requested; reading the barcode information to thereby generate authentication information for a mobile station, and providing the bank server with the barcode information and the authentication information over the mobile communication network by the mobile station; receiving the barcode information, and providing the mobile communication network with location information of the bank terminal by the bank server; comparing the location information of the bank terminal with location information of the mobile terminal, and transmitting a service approval message to each of the bank server and the mobile station by the mobile communication network when the location information of the bank terminal corresponds to the location information of the mobile station; and providing the banking service through the bank terminal, and providing the mobile terminal with a result of the banking service through the mobile communication network by the bank server.

In accordance with yet another aspect of the present invention, there is provided a mobile station apparatus for receiving a banking service by using a financial service provided over a mobile communication network that can provide packet data, the apparatus includes a barcode reader for reading a barcode; a memory for storing banking service information; a modem for modulating/demodulating data so as to perform packet communication; a radio processor for transmitting/receiving the data over a packet communication channel; and a controller for controlling the mobile station apparatus to generate a transmission message by using the barcode information received from the barcode reader and authentication information for the mobile station apparatus and transmit the generated transmission message to the mobile communication network through the modem and the radio processor when the banking service is received, and controlling the mobile station apparatus to store banking service data received through packet data in the memory.

In accordance with still yet another aspect of the present invention, there is provided a method of receiving a banking service by using a financial service provided to a mobile station in a mobile communication network that can provide packet data, the method includes reading barcode information, and transmitting the read barcode information to the mobile communication network when the banking service is received; performing the banking service when an approval message is received from the mobile communication network; and receiving and storing banking service data after the banking service is performed.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
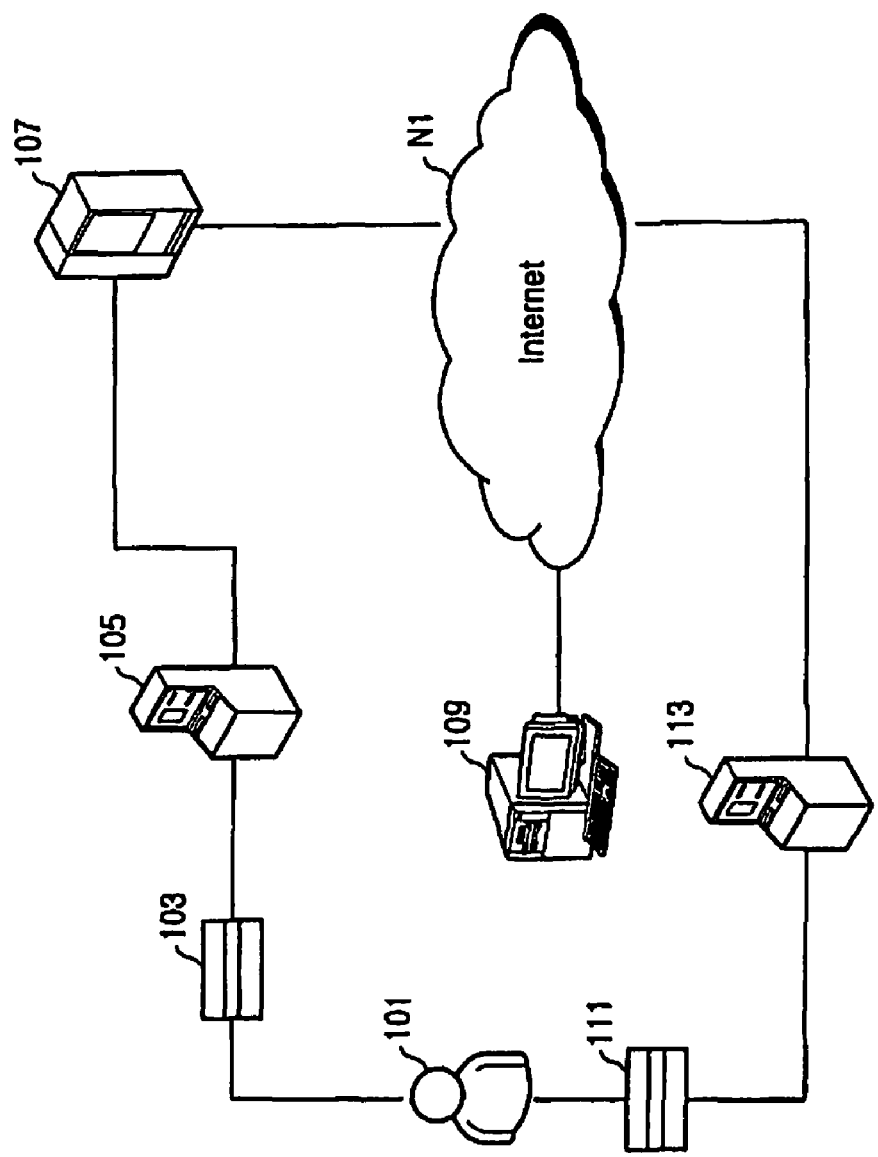
FIG. 1 is a block diagram illustrating the structure of a conventional communication network for providing a financial service.

Hereinafter, exemplary embodiments of the present invention will be described with reference to the accompanying drawings. In the following description, the same elements will be designated by the same reference numerals although they are shown in different drawings. Further, in the following description, only parts necessary for understanding operations of the present invention will described, and a detailed description of known functions and configurations incorporated herein will be omitted so as not to make the subject matter of the present invention rather unclear.

According to a basic concept of the present invention, a mobile station is provided with at least one electronic passbook through which a user of the mobile station transacts with a bank that has issued the electronic passbook. The mobile station is further provided with a barcode reader as authentication means for communicating with an ATM/CD installed in a bank branch or public place. The ATM/CD receives a barcode, allocated according to locations of ATM/CDs, from a bank server, and outputs the received barcode on a Liquid Crystal Display (LCD) screen or the like thereof when the user uses a financial service through the mobile station.

When a financial service is used, the mobile station of the present invention recognizes a barcode output from an ATM/CD, and transmits the barcode to a mobile communication network. The mobile communication network then performs authentication for service approval by comparing location information received from a bank server with that identified in the process of registering a location of the corresponding mobile station. An approved user for the financial service performs financial transactions, such as a deposit/withdrawal transaction, an account transfer transaction, etc., and the bank server transmits updated passbook data to the corresponding mobile station over the mobile communication network.

The mobile station of the present invention can receive updated passbook data and record the received data onto the electronic passbook in real time whenever a financial transaction is performed, which enables the user of the mobile terminal to check financial transaction histories without personally updating the passbook in offline.

In the exemplary embodiments of the present invention, as will be described below, a mobile communication is assumed to be a Wireless Broadband (WiBro) system based on the Institute of Electrical Electronic Engineers (IEEE) 802.16e standard. The reason for this is to transmit/receive mass packet data, such as passbook data, in real time. However, it should be noted that the present invention may be applied to all types of mobile communication networks capable of transmitting/receiving mass packet data at high speed, and the present invention is not necessarily limited to the WiBro system.

Figure 2:
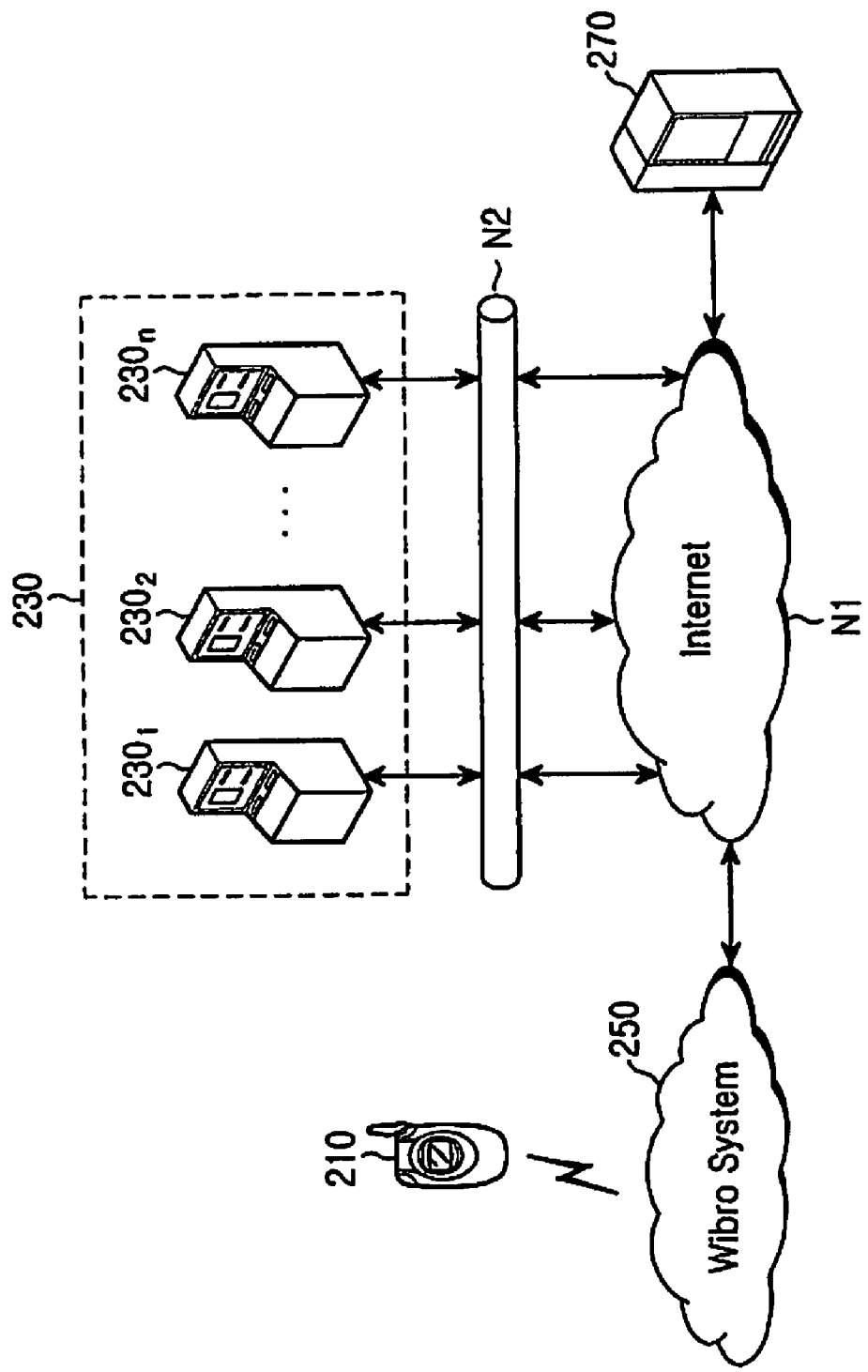
FIG. 2 is a block diagram illustrating the structure of a communication network for providing a financial service through a mobile station in accordance with an exemplary embodiment of the present invention.

FIG. 2 illustrates the structure of a communication network for providing a financial service through a mobile station according to an exemplary embodiment of the present invention.

The mobile station 210 in FIG. 2 stores at least one bank passbook, in the form of an electronic passbook and with which an account of a user is registered, in an internal memory (not shown). In this embodiment of the present invention, the mobile station 210 can be provided with the common Internet banking service through the electronic passbook, and additionally can be provided with a banking service including a deposit/withdrawal transaction, an account transfer transaction, etc. (i.e. a mobile banking service) by communicating with an automatic teller machine (ATM/CD) 230 ($230_1$ to $230_n$) of a bank or the like through a barcode reader (not shown).

The present invention proposes not only a separate authentication scheme for the mobile banking service, but also a way to update financial transaction histories onto the electronic passbook of the mobile station 210 in real time. Here, the electronic passbook may be configured in such a manner as to support the mobile banking service as well as the common Internet banking service.

The Internet banking service provided through the mobile station 210 will be described. A user of the mobile station 210 selects a desired bank site via a menu screen displayed by manipulating the keypad of the mobile station 210. The mobile station 210 then accesses a site, which a bank server 270 operates, over the WiBro system 250. In this case, the mobile station 210 can be provided with the Internet banking service only by inputting a previously registered password of the electronic passbook without a separate authentication procedure because it has already passed through user authentication at the initial access to the Internet N1. Once the Internet banking service comes to an end, the mobile station 210 receives passbook data including financial transaction histories from the bank server 270 in real time, and updates the electronic passbook included therein.

The mobile banking service in which the mobile station 210 is connected with the ATM/CD 230 will be described. In FIG. 2, the ATM/CD 230 of a bank or the like receives a barcode, allocated according to the location of the corresponding ATM/CD, from the bank server 270 and outputs the received barcode through an LCD window (not shown) provided therein when the user uses the financial service. Although it is assumed that the barcode is transmitted from the bank server 270 whenever the user uses the financial service, such a barcode transmission process may be omitted, and a barcode fixedly allocated to each ATM/CD 230 or a barcode periodically changed for the purpose of security may be used. Also, communication between the ATM/CD 230 and the bank server 270 is performed over a given communication network N2, such as a bank network, etc.

In using the financial service, the mobile station 210 recognizes the barcode output from the ATM/CD 230 by means of a barcode reader, and transmits the recognized barcode to the WiBro system 250. The WiBro system 250 then transmits the barcode, received from the mobile station 210, to the corresponding bank server 270 over the Internet N1. On receiving the barcode, the bank server 270 inquires location information of the ATM/CD 230, to which the barcode is allocated, of a database (not shown), and transmits the location information of the ATM/CD 230 to the WiBro system 250. The WiBro system 250 compares the location information of the ATM/CD 230, received from the bank server 270, with that identified in the process of registering the location of the mobile station 210, and performs authentication for financial service approval when both the information coincide with each other.

If the financial service for the mobile station 210 is approved, the user of the mobile station 210 performs financial transactions, such as a deposit/withdrawal transaction, etc., through the ATM/CD 230, and the ATM/CD 230 transmits information on corresponding financial transaction histories to the bank server 270. The bank server 270 generates passbook data updated by the corresponding financial transaction histories, and transmits the generated passbook data to the WiBro system 250. Also, the mobile station 210 receives its passbook data from the WiBro system 270 to thereby update data of the electronic passbook in real time.

In the aforementioned structure, the mobile station 210 can stably transmit/receive data to/from the bank server 270 through the WiBro system 250 providing a high-speed data transfer rate. Further, since the mobile station 210 in the WiBro system 250 can always maintain access to the Internet N1, the mobile station 210 can reduce initial access delay when using the mobile banking service. Furthermore, the WiBro system 250 ensures a high uplink bandwidth and mobility, and thus can easily provide the user with various financial services.

Figure 3:
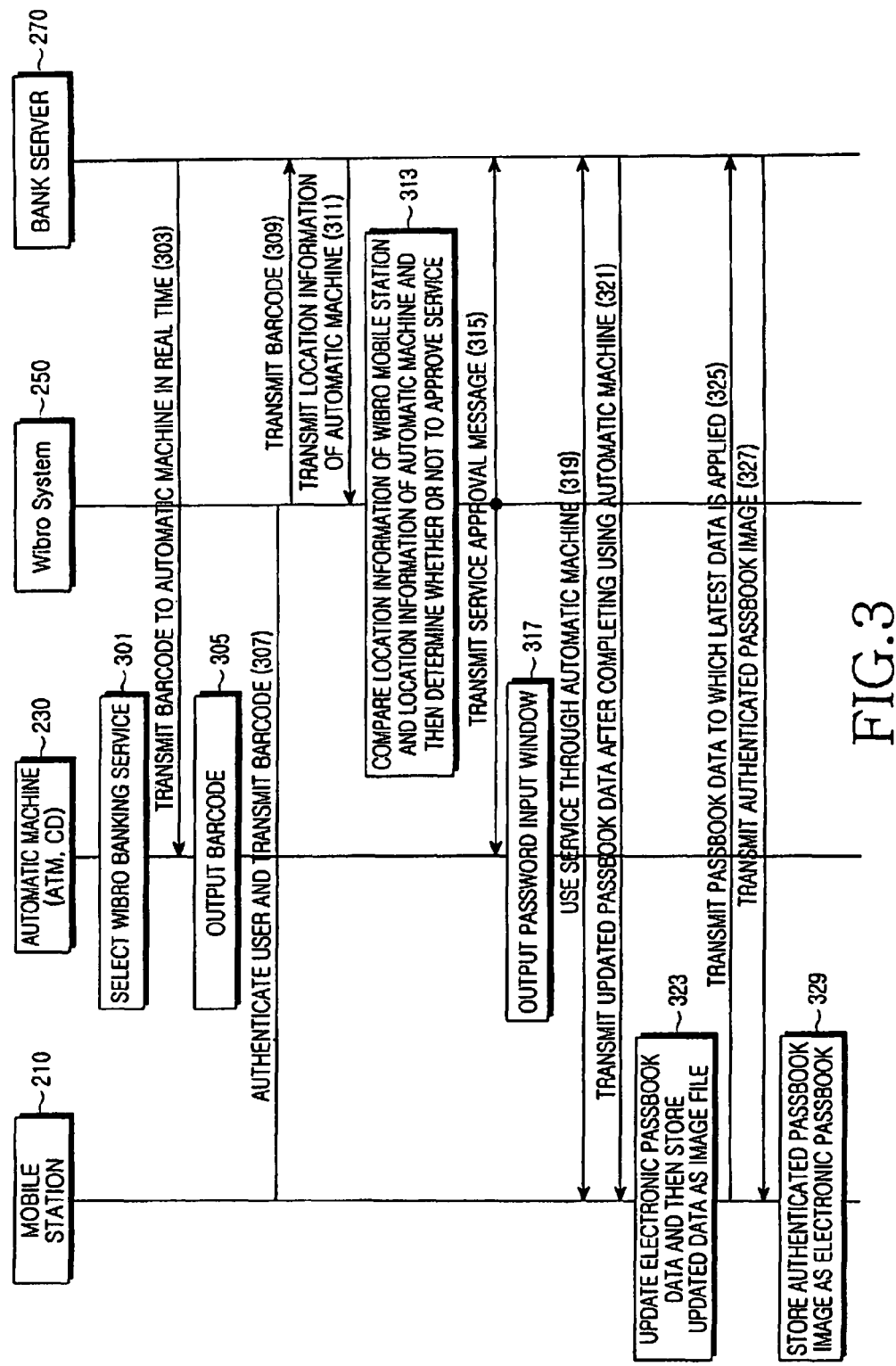
FIG. 3 is a flowchart illustrating a procedure of providing a mobile station with a mobile banking service through an ATM/CD in accordance with an exemplary embodiment of the present invention.

FIG. 3 illustrates a procedure of providing a mobile station with a mobile banking service through an ATM/CD according to an exemplary embodiment of the present invention, that is, a procedure in the mobile station 210 performs service authentication by using the barcode recognized from the ATM/CD 230, is provided with the mobile banking service, and then updates passbook data in real time.

In step 301 of FIG. 3, a user who wants to receive the mobile banking service through the ATM/CD 230 selects a mobile banking service menu item, for example "WiBro Banking Service", from among menu options of the ATM/CD 230. In step 303, the ATM/CD 230 receives a barcode for ATM/CD identification from the bank server 270 in real time, and displays the received barcode on the LCD window of the ATM/CD 230. Although not illustrated in FIG. 3, the ATM/CD 230 transmits a message requesting the barcode transmission to the bank server 270 according to the selection of the mobile banking service. Although the embodiment in FIG. 3 assumes that the ATM/CD 230 receives a barcode from the bank server 270 whenever the user selects the mobile banking service, a barcode prearranged for each ATM/CD may be used, a changed barcode may be periodically transmitted to the ATM/CD 230, or any other scheme for using the barcode may be employed.

In step 305 of FIG. 3, the ATM/CD 230 outputs the barcode received from the bank server 270 through the LCD window (not shown). In step 307, the user approaches the barcode reader of the mobile station 210 to the barcode output on the LCD screen of the ATM/CD 230, and then causes the mobile station 210 to recognize the barcode by key manipulation. The mobile station 210 transmits a message including the recognized barcode to the WiBro system 250. Also, in step 307, the mobile station 210 and a base station (not shown) of the WiBro system 250 transmit/receive messages for optional user authentication. The WiBro system 250 transmits the barcode received from the mobile station 210 to the bank server 270 in step 309, and in response to this, the bank server 270 transmits the registered location information of the ATM/CD 230, to which the corresponding barcode is allocated, to the WiBro system 250 in step 311.

In step 313 of FIG. 3, the WiBro system 250 compares the location information of the ATM/CD 230, received from the bank server 270, with the current location information of the mobile station 210 that has transmitted the barcode in step 307. Location information according to a general procedure of registering the location of a mobile station in a mobile communication network may be used as the location information of the mobile station 210. Since the ATM/CD 230 is installed in a fixed place, a unique barcode is allocated to each ATM/CD, and if the ATM/CD registers installation location information corresponding to the allocated barcode, the bank server 270 can provide the WiBro system 250 with the location information of the ATM/CD 230 from which the barcode is received.

A result of the comparison in step 313 shows that the location information of the ATM/CD 230 corresponds to that of the mobile station 210, the WiBro system 250 generates a service approval message approving the user for use of the mobile banking service, and transmits the generated service approval message to each of the ATM/CD 230 and the bank server 270. Although not illustrated in FIG. 3, if the location information of the ATM/CD does not correspond to that of the mobile station 210, the WiBro system 250 regards the user as an abnormal service user to thus generate a service rejection message, and transmits the generated service rejection message to each of the ATM/CD 230 and the bank server 270.

In step 317 of FIG. 3, the ATM/CD 230 displays a password input window requesting the corresponding user to input his/her passbook password when the service approval message is received, and displays an advice message indicating that the corresponding user cannot use the mobile banking service when the service rejection message is received. When the user is approved for use of the service, in step 319, the user inputs his/her passbook password into the ATM/CD 230, and then performs financial transactions, such as a deposit/withdrawal transaction, an account transfer transaction, etc., by manipulating the keypad of the ATM/CD 230.

Although the user inputs his/her passbook password directly into the ATM/CD 230 in this embodiment, it is possible for the user to input his/her passbook password into the mobile station 210, which in turn communicates with the ATM/CD 230 to thereby notify the ATM/CD 230 that the password is normally input. Communication between the mobile station 210 and the ATM/CD 230 may be performed using, for example, infrared communication or a wired/wireless communication port of the mobile station 210.

Subsequently, if the user completes his/her use of the ATM/CD 230, in step 321, the bank server 270 transmits updated passbook data for the corresponding user to the mobile station 210 through the WiBro system 250. In step 323, the mobile station 210 updates the electronic passbook stored in its memory, based on the passbook data received in step 321, and stores the updated electronic passbook in an image file format. When the mobile station 210 uses a Subscriber Identity Module (SIM) card, the electronic passbook may be stored in the SIM card.

Steps 325 to 329 of FIG. 3 correspond to an additional procedure for authenticating the electronic passbook. In step 325, the mobile station 210 transmits the updated electronic passbook data to the bank server 270. In step 327, the bank server 270 compares the electronic passbook data received in step 325 with passbook data for the corresponding user recorded in its internal database, and transmits an authenticated passbook image file to the mobile station 210 when both the data are the same. In step 329, the mobile station 210 then stores the received passbook image file as the electronic passbook.

Figure 4:
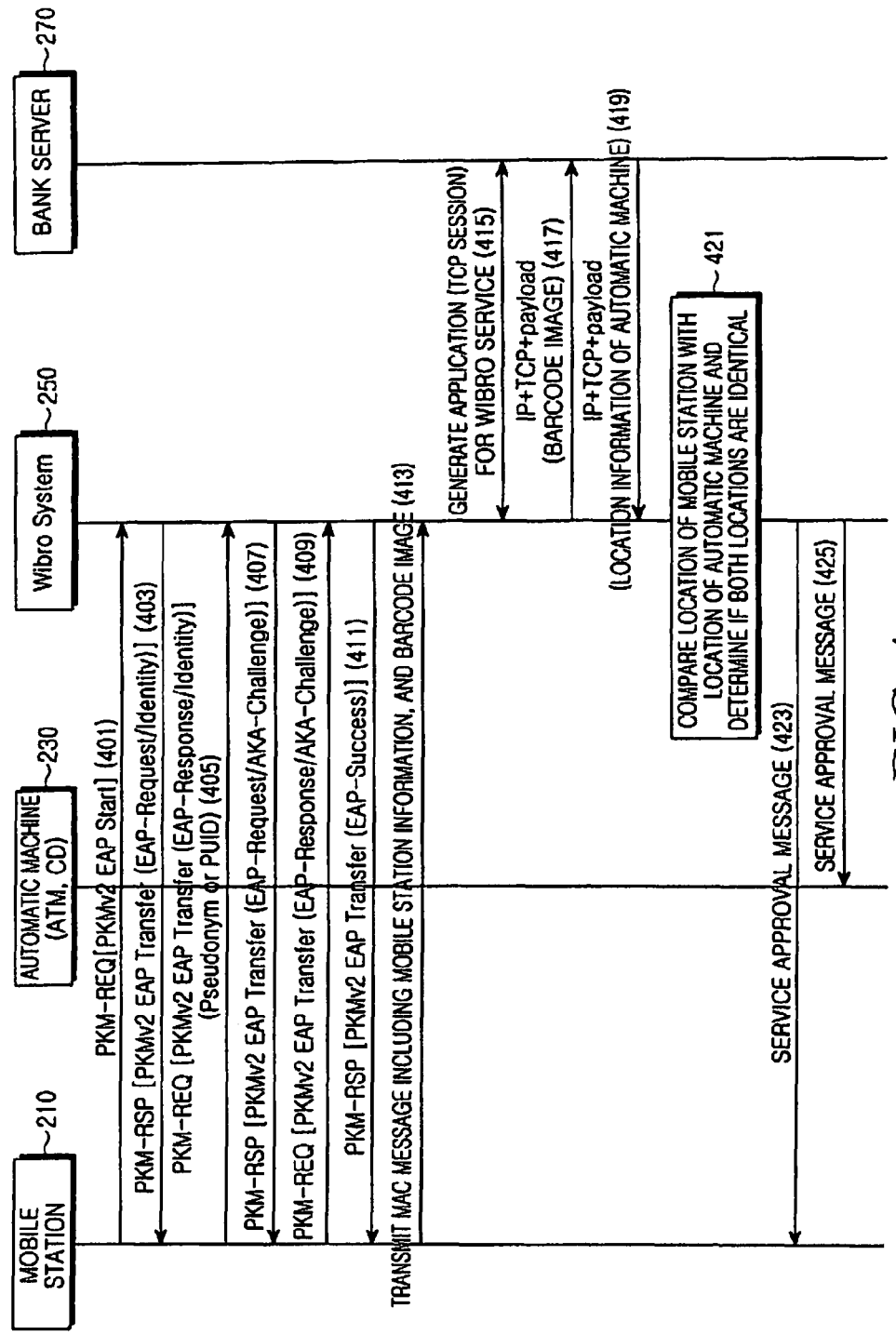
FIG. 4 is a flowchart illustrating a service authentication procedure for a mobile station to be provided with a mobile banking service in accordance with an exemplary embodiment of the present invention.

FIG. 4 illustrates a service authentication procedure for a mobile station to be provided with a mobile banking service according to an exemplary embodiment of the present invention, that is, the user authentication process performed in step 307 of FIG. 3 and the service approval process performed in steps 309 to 315 of FIG. 3.

First, steps 401 to 411 of FIG. 4 correspond to a user authentication process in which Private Key Management REQuest/Private Key Management-ReSPonse (PKM-REQ/PKM-RSP) messages for authenticating the user of the mobile station 210 are transmitted/received. Here, the PKM-REQ/PKM-RSP message uses the Privacy Key Management (PKM) message and the Extensible Authentication Protocol (EAP) defined in the IEEE 802.16e standard. The EAP is a protocol used for strengthening security-related functions in the IEEE 802.16e standard.

In step 401 of FIG. 4, the mobile station 210 transmits a PKM-REQ (EAP-Start) message requesting user authentication to a base station (not shown) of the WiBro system 250. In step 403, the base station transmits a PKM-RES (EAP-Request/Identity) message to the mobile station 210, thereby requesting the mobile station 210 to transmit identification information. In step 405, the mobile station 210 transmits a PKM-REQ (EAP-Response/Identity) message including its identification information to the base station. In step 407, the base station calculates parameters necessary for user authentication by performing the Extensible Authentication Protocol-Authentication and Key Agreement (EAP-AKA) algorithm defined in the IEEE 802.16e standard, and transmits the calculated parameters to the mobile station 210. In step 409, the mobile station 210 performs the EAP-AKA algorithm by using the received parameters, and transmits a result of performing the EAP-AKA algorithm to the base station. Using the EAP-AKA result received from the mobile station 210, the base station determines in step 411 whether user authentication succeeds or fails, and transmits an authentication result to the mobile station 210.

On successfully completing user authentication in step 411, the mobile station 210 transmits a barcode image recognized from the ATM/CD 230, together with a Message Authentication Code (MAC) message including the mobile station information, to the WiBro system 250 in step 413. On receiving the barcode image, the WiBro system 250 establishes a TCP session for communication with the bank server 270 in step 415, and transmits the barcode image to the bank server 270 in step 417.

In step 419, the bank server 270 analyzes the received barcode image, inquires information on the location of the ATM/CD 230 according to a result of the analysis, and then transmits the acquired location information of the ATM/CD 230 to the WiBro system 250. The WiBro system 250 then determines in step 421 if the location information of the mobile station 210 matches the location of the ATM/CD 230, and transmits a message approving or rejecting the mobile banking service to the ATM/CD 230 in step 425. The approval or rejection message may also be transmitted to the mobile station 210, as in step 423.

The structure and operation of each of the mobile station 210, the WiBro system 250 and bank server 270 that support the mobile banking service will be described with reference to FIGS. 5 to 10.

Figure 5:
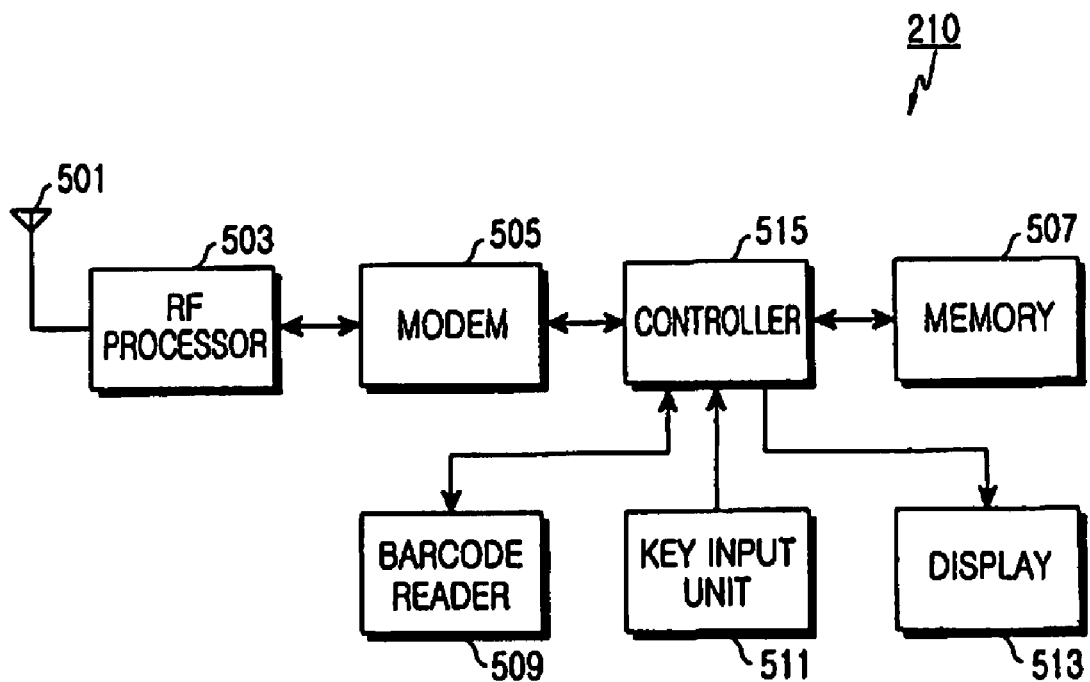
FIG. 5 is a block diagram illustrating the structure of a mobile station in accordance with an exemplary embodiment of the present invention.
Figure 6:
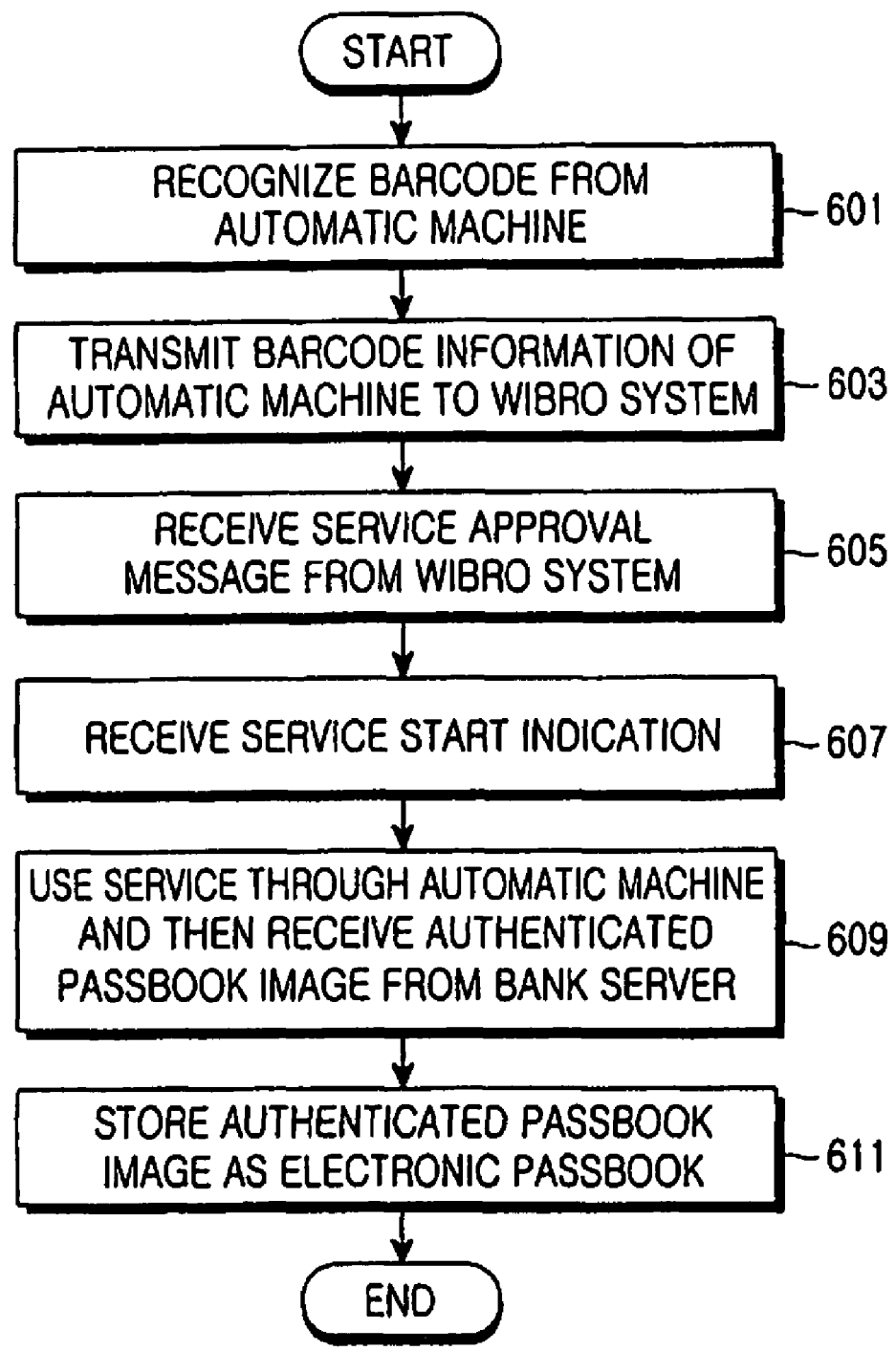
FIG. 6 is a flowchart illustrating a procedure of performing a mobile banking service in the mobile station of FIG. 5.

FIG. 5 illustrates the structure of a mobile station 210 according to an exemplary embodiment of the present invention, and FIG. 6 illustrates a procedure of performing the mobile banking service in such a mobile station 210.

The mobile station 210 of FIG. 5 includes an antenna 501, an RF processor 503 for performing frequency up-/downconversion for RF signal transmission/reception, a modem 505 for processing modulation/demodulation and encoding/decoding of a transmitted/received signal, a key input unit 511, and a display 513. The mobile station 210 further includes a memory 507 for storing an electronic passbook according to the present invention, a barcode reader for recognizing a barcode from the ATM/CD 230, and a controller for controlling the overall operation of the mobile station 210 according to a procedure to be described below with reference to FIG. 6.

Referring to FIG. 6, a user who wants to use the mobile banking service according to this embodiment selects a menu item, for example "WiBro Banking Service", from among menu options provided from the display window of the ATM/CD 230. As a result of this, the ATM/CD 230 receives a barcode for service authentication from the bank server 270, and outputs the received barcode through its display window. The user of the mobile station 210 drives a program for using the mobile banking service by manipulating the keypad of the mobile station 210. The memory 507 of FIG. 5 is provided with such a program, and the controller 515 operates the barcode reader 509 according to the operation routine of the program.

In step 601 of FIG. 6, the barcode reader 509 of the mobile station 210 recognizes the barcode displayed from the ATM/CD 230, and the controller 515 of FIG. 5 stores the recognized barcode as an image in the memory 507. In step 603, the controller 515 controls the RF processor 503 and the modem 505 to transmit/receive a PKM-REQ/PKM-RSP message for user authentication to/from the WiBro system 250, as described in FIG. 4. On completing the user authentication, the controller 515 transmits the barcode image stored in the memory 507, together with information on the corresponding mobile station, to the WiBro system 250.

In step 605, the controller 515 controls the RF processor 503 and the modem 505 to receive a result of a location information comparison using the barcode from the WiBro system 250. FIG. 6 illustrates a case where the mobile banking service for the corresponding user is approved based on the result of the location information comparison, and thus a service approval message is received. The controller 5151 receives a service approval message. When the passbook password of the user is normally input into the ATM/CD 230 according to step 317 of FIG. 3, the mobile station 210 may receive a message indicating the start of the service from any one of the ATM/CD 230, the WiBro system 250, or the bank server 270 in step 607. Although the operations of steps 605 and 607 are not illustrated in FIG. 3, they may be provided for the sake of user convenience.

When the service approval message and/or the message indicating the start of the service are/is not transmitted to the mobile station 210, an advice message is displayed as an indication of the service approval/start through the display window of the ATM/CD 230, and the user can confirm the approval for the mobile banking service by the advice message. In step 609, the controller 515 of the mobile station 210 uses services through the ATM/CD 230, such as a deposit/withdrawal service, an account transfer service, etc., and then receives a passbook image from the bank server 270 via the WiBro system 250. In step 611, the controller 515 updates the electronic passbook stored in the memory 507, based on the received passbook image.

In order to ensure stable financial transactions, the operation of updating the electronic passbook, performed in steps 609 and 611, may be authenticated from the bank server 270, as described through steps 325 to 329 in FIG. 3. Thus, according to the aforementioned structure and operation of the mobile station 210, the user can not only use the ATM/CD 230 installed in a bank or a public place by using his/her mobile station 210 without carrying a conventional bank card with him/her, but also update the electronic passbook by receiving service use histories through the ATM/CD 230 and recording the received histories into the electronic passbook, so that he/she can avoid the inconvenience of updating his/her passbook as in the prior art.

Figure 7:
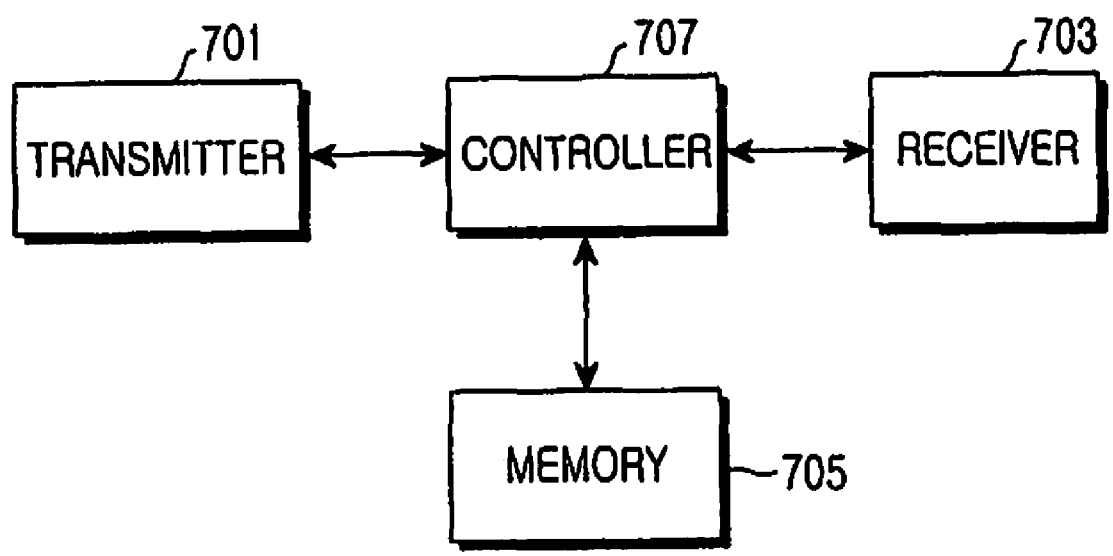
FIG. 7 is a block diagram illustrating the structure of a base station in accordance with an exemplary embodiment of the present invention.
Figure 8:
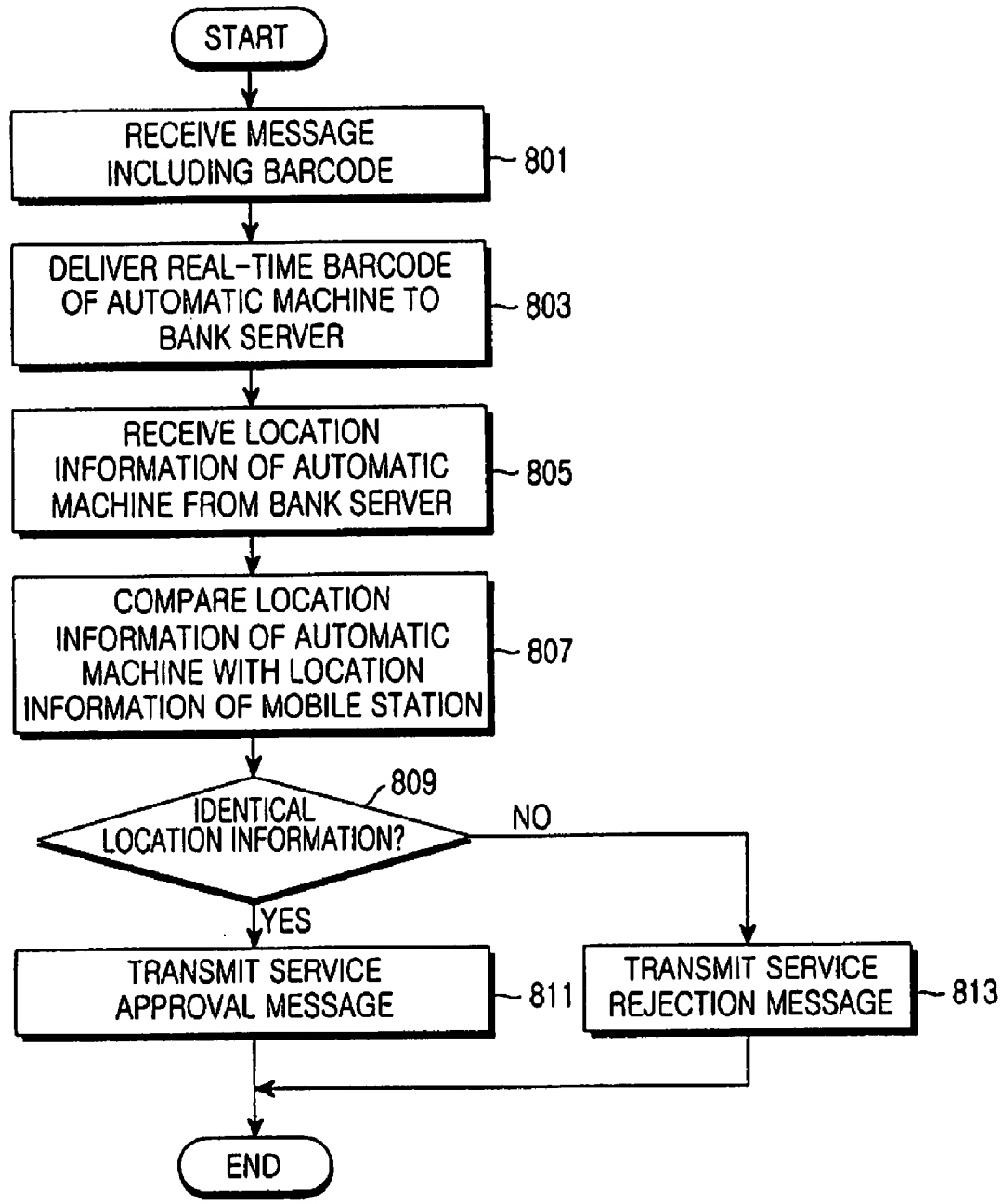
FIG. 8 is a flowchart illustrating a procedure of performing a mobile banking service in the base station of FIG. 7.

FIG. 7 illustrates the structure of a base station in the WiBro system according to an exemplary embodiment of the present invention, and FIG. 8 illustrates a procedure of performing the mobile banking service in such a base station.

The base station of FIG. 7 is an element corresponding to the WiBro system 250 of FIG. 2, and embodiments of the present invention assumes that the base station is responsible for the overall operation to be performed in the WiBro system 250. However, it is also possible to include a dedicated server for the mobile banking service in the WiBro system, and perform the overall operation by the dedicated server taking place of the base station, except an operation of wirelessly communicating with the mobile station 210.

Referring to FIG. 7, the base station includes a transmitter 701 and a receiver 703 for transmitting/receiving a barcode image and passbook data to/from the mobile station 210 and the bank server 270, a memory 705 for temporarily storing various data exchanged with the mobile station 210 and the bank server 270, and a controller 707 for controlling the overall operation as described above in FIGS. 3 and 4, including an operation of transmitting/receiving a PKM-REQ/PKM-RSP message for user authentication, a barcode for service authentication and passbook data according to using the mobile banking service, and an operation of determining whether to approve the service by comparing location information of the user with that of the ATM/CD 230, identified by the barcode.

Reference will now be made to the operation of the base station with reference to FIG. 8. In step 801, the controller 707 of the base station receives a message including a barcode image, together with identification information of the mobile station 210 which is to use the mobile banking service, from the corresponding mobile station. In step 803, the controller 707 transmits the barcode image received in step 801 to the bank server 270. The controller 707 receives the location information of the ATM/CD 230, corresponding to the relevant barcode, from the bank server 270 in step 805, and compares the location of the ATM/CD 230 with that of the mobile station 210 in step 807, which can be identified through the WiBro system 250, to thereby determine in step 809 if the location information of the ATM/CD 230 corresponds to the location information of the mobile station 210.

The location information of the ATM/CD 230 need not be completely the same as that of the mobile station 210. If a difference between the locations indicated by the location information of the ATM/CD 230 and the location information of the mobile station 210 is within a predetermined error range, the ATM//CD 230 and the mobile station 210 may be preferably determined to be located in the same place. When a result of the comparison in step 807 shows that the ATM/CD 230 and the mobile station 210 are located in the same place, the base station transmits a service approval message approving the corresponding user for use of the mobile banking service to each of the ATM/CD 230 and the mobile station 210 in step 811.

However, when a result of the comparison in step 807 shows that the ATM/CD 230 and the mobile station 210 are located in different places, the base station transmits a service rejection message rejecting the corresponding user's request for use of the mobile banking service to each of the ATM/CD 230 and the mobile station 210 in step 813. With regard to this, the user may repeat the steps following step 301 of FIG. 3 for a specified number of times. However, in order to prevent illegal use of the mobile banking service, it is also possible to set up the WiBro system 250 and/or the bank server 270 such that the service for the corresponding user is suspended when the steps following step 310 are repeated beyond the specified number of times.

Figure 9:
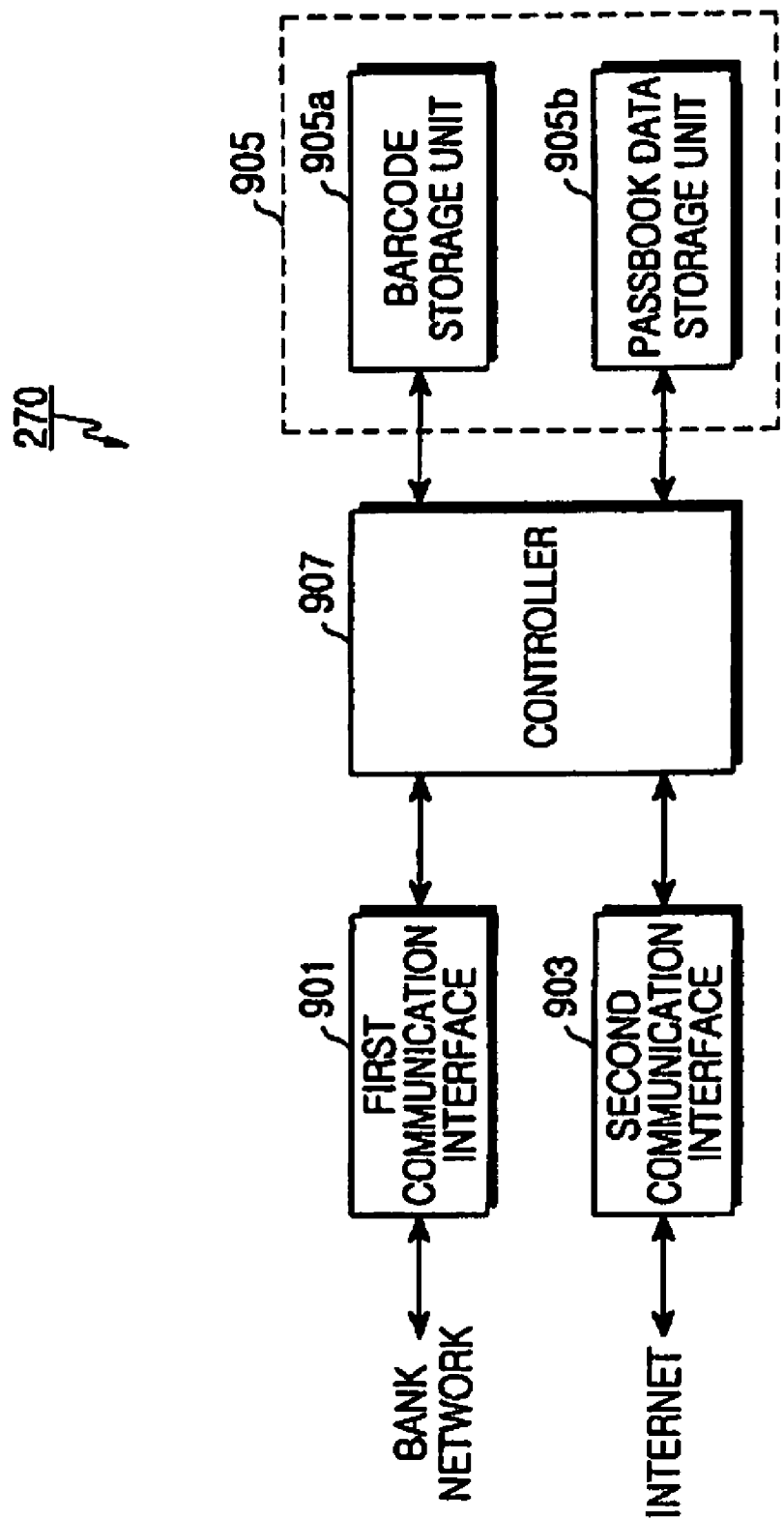
FIG. 9 is a block diagram illustrating the structure of a bank server in accordance with an exemplary embodiment of the present invention.
Figure 10:
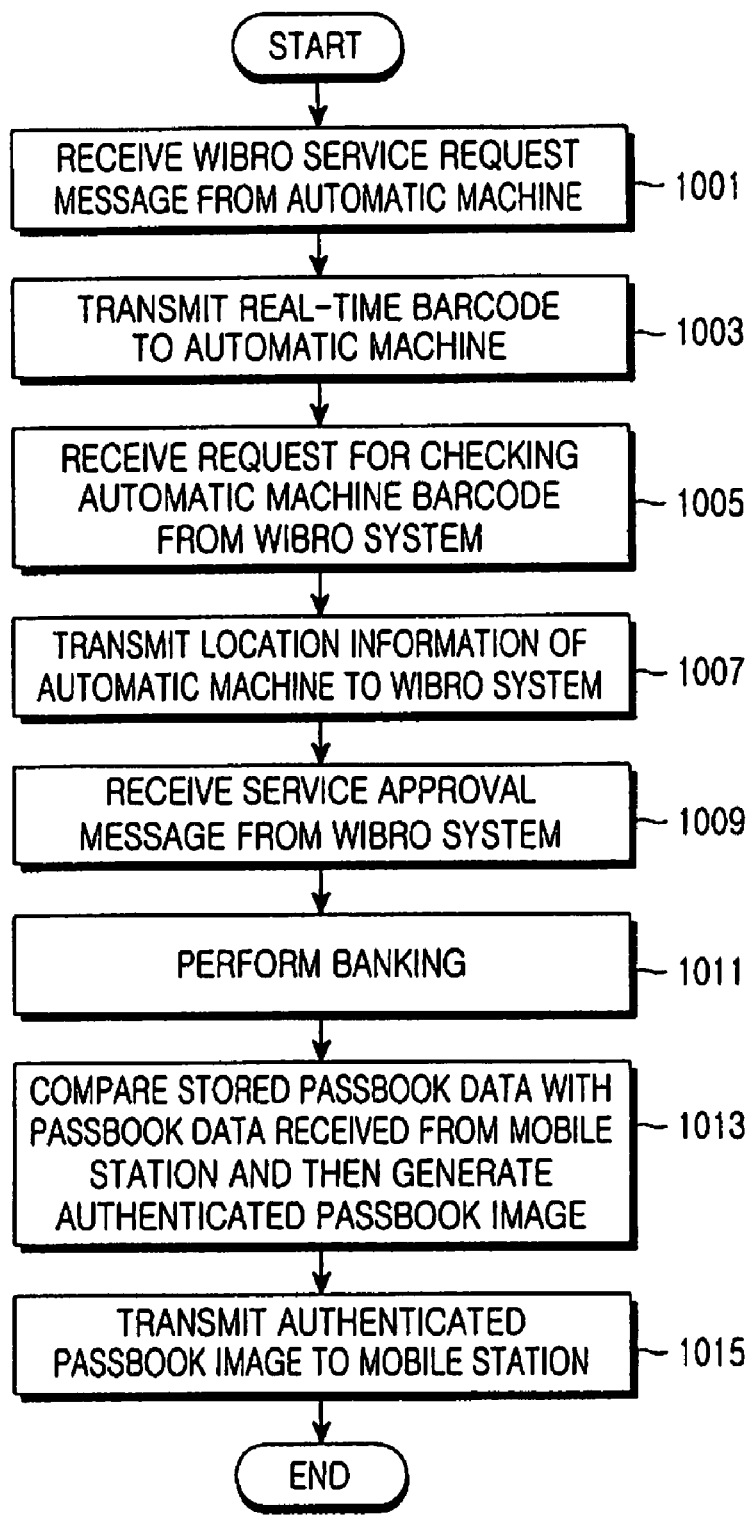
FIG. 10 is a flowchart illustrating a procedure of performing a mobile banking service in the bank server of FIG. 9.

FIG. 9 illustrates the structure of a bank server 270 according to an exemplary embodiment of the present invention, and FIG. 10 illustrates a procedure of performing a mobile banking service in the bank server 270 of FIG. 9.

The bank server 270 of FIG. 9 includes a first communication interface 901 for communicating with the ATM/CD 230 over a bank network, a second communication interface 903 for communicating with the WiBro system 250 over the Internet, a database 905 having a barcode storage unit 905a and a passbook data storage unit 905b, and a controller 907 for controlling the overall operation of the bank server 270. The controller 907 controls the bank server 270 to transmit an allocated barcode to the ATM/CD 230 when a message requesting barcode transmission is received from the corresponding ATM/CD 230 according to the user's selection of the mobile banking service, and transmit location information of the corresponding ATM/CD 230 to the WiBro system 250 when the barcode is received from the WiBro system 250.

The controller 907 also transmits updated passbook data to the WiBro system 250 when the user terminates use of the mobile banking service. Further, in the authentication operation according to steps 325 to 329 of FIG. 3, the controller 907 compares passbook data received from the mobile station 210 with passbook data stored in the database 905, and transmits authenticated passbook data back to the mobile station 210 when both the data are the same. To this end, the database 905 stores barcode information of a number of ATMs/CDs under the control of the corresponding bank in the barcode storage unit 905a, and stores installation location information of the corresponding ATM/CD 230 in such a manner as to correspond to each barcode information. Further, the passbook data storage unit 905b stores passbook data of a number of users using the mobile banking service in such a manner as to correspond to identification information of the corresponding user. The identification information may be specified in various types, such as the user's account number, phone number, Identification (ID), unique number, etc.

Reference will now be made to the operation of the bank server 270 with reference to FIG. 10. When the user selects the mobile banking service, the controller 907 of the bank server 270 a service request message requesting barcode transmission from the ATM/CD 230 through the first communication interface 901 in step 1001, and transmits an allocated barcode to the corresponding ATM/CD 230 in step 1003. Thus, the service request message may include identification information of the corresponding ATM/CD 230. When the mobile station 210 recognizes the barcode and transmits the recognized barcode to the bank server 270 via the WiBro system 250 in step 1005, the controller 907 acquires the location information of the corresponding ATM/CD 230, corresponding to the barcode, of the database 905 and transmits the acquired location information of the corresponding ATM/CD 230 to the WiBro system 250 in step 1007.

Subsequently, when a service approval message according to step 313 of FIG. 3 is received in step 1009, the controller 907 processes banking according to operations of the corresponding ATM/CD 230 in step 1011. After banking processing in step 1011 is completed, in step 1013, the controller 907 transmits updated passbook data to the mobile station 210, and receives passbook data stored in the mobile station 210 in response thereto. The controller 907 then generates authenticated passbook data when a result of comparing the passbook data received from the mobile station 210 with the corresponding user's passbook data stored in the database 905 shows that both the data are the same. In step 1015, the controller 907 transmits the authenticated passbook data back to the mobile station 210 to thereby complete the mobile banking service. The operation of authenticating the passbook data may be optionally performed as described above.

Figure 11:
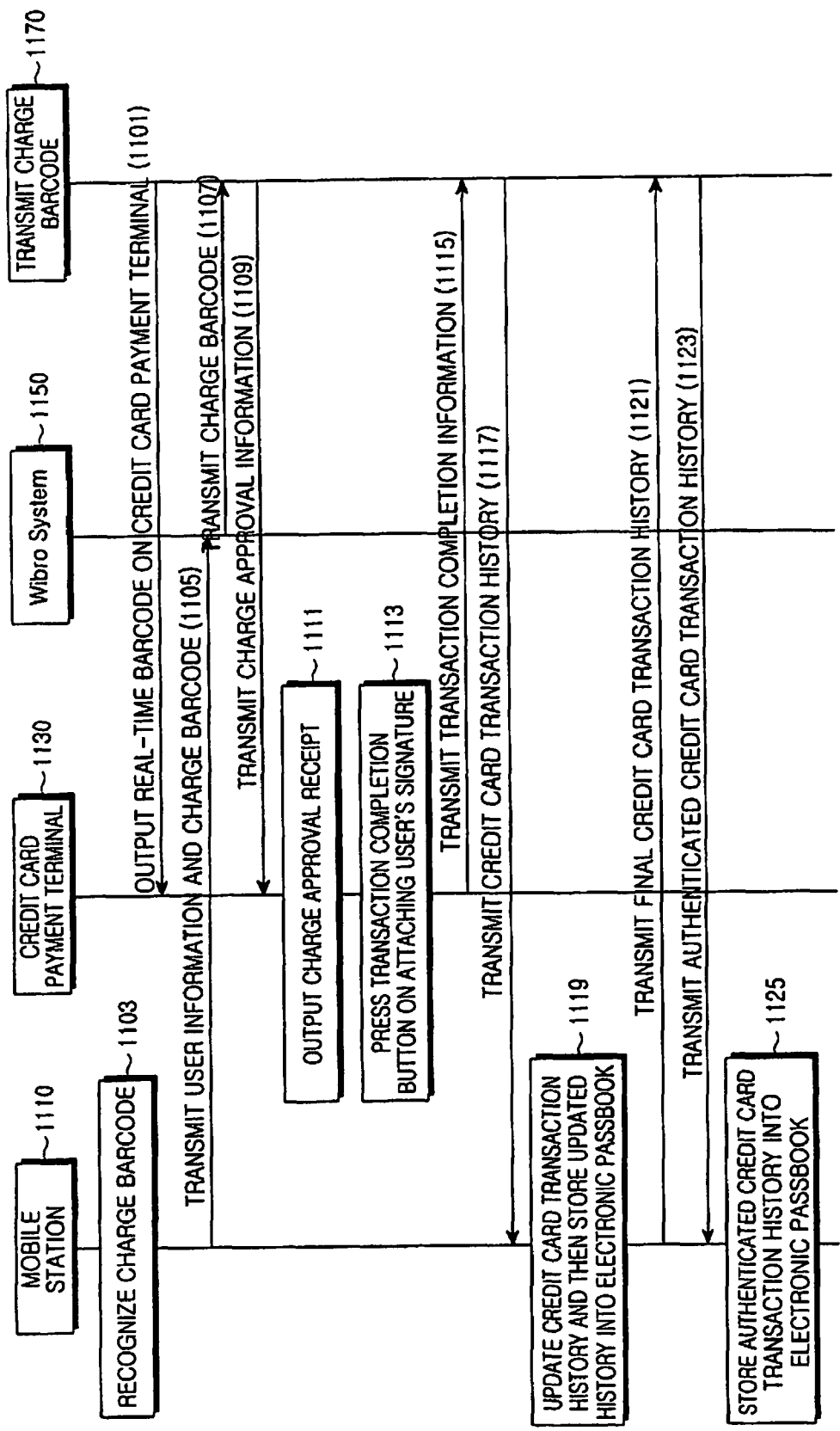
FIG. 11 is a flowchart illustrating a procedure of providing a mobile station with a financial service through a credit card payment terminal in accordance with another exemplary embodiment of the present invention.

FIG. 11 illustrates a procedure of providing a mobile station with a financial service through a credit card payment terminal according to another exemplary embodiment of the present invention. In the procedure of FIG. 11 a mobile station recognizes the barcode of a bill printed/displayed from a credit card payment terminal, transmits the recognized barcode, user information and a charge to a credit card company server so as to approve credit card payment, and then updates the credit card transaction history, received from the credit card company server, onto an electronic passbook in real time. In this embodiment, a barcode to be recognized by a mobile station is proposed to take place of existing offline credit card functions.

In step 1101 of FIG. 11, when a subscriber pays for a commodity/service by means of his/her credit card, a credit card company server 1170 transmits an allocated barcode to a credit card payment terminal 1130 according to a payment request of the credit card payment terminal 1130. The credit card payment terminal 1130 may be constructed by adding a barcode reception and display/print function to a common credit card reader. Similar to the mobile station 210 of FIG. 3, the mobile station 1110 of FIG. 11 is configured in such a manner as to have an electronic passbook and a barcode reader, and update its electronic passbook based on credit card transaction histories, received from the credit card company server 1170.

Thus, in step 1101, the credit card payment terminal 1130 receives a barcode from the credit card company server 1170 in real time, and prints/displays a bill including the received barcode. Although not illustrated in FIG. 11, the credit card payment terminal 1130 transmits a message requesting barcode transmission to the credit card company server 1170 when a user makes credit card payment. In step 1103, the user approaches the barcode reader of the mobile station 1110 transmits to the barcode of the bill printed/displayed from the credit card payment terminal 1130, and then recognizes the barcode. In step 1105, the mobile station 1110 a message including the recognized barcode, user information and a charge to the WiBro system 1150. The charge is a charge to be paid by the user through the credit card payment terminal 1130, and may be input directly through the mobile station 1110 or may be recognized together with the barcode by the barcode reader.

The WiBro system 1150 transmits the charge and the barcode information, received from the mobile station 1110, to the credit card company server 1170 in step 1107, and the credit card company server 1170 acquires a commodity/service charge corresponding to the barcode, compares the commodity/service charge received from the mobile station 1110 with the commodity/service charge in the message received from the credit card payment terminal 1130, and then transmits charge approval information to the credit card payment terminal 1130 when both the charges are the same. The credit card payment terminal 1130 outputs an approved receipt for the corresponding charge in step 1111, and transmits transaction completion information according to the completion of a transaction with the user to the credit card company server 1170 in steps 1113 and 1115. Although not illustrated in FIG. 11, when both the charges are not the same, the credit card company server 1170 regards the corresponding transaction as abnormal use of the credit card, and thus generates charge rejection information rejecting the user's credit card payment and transmits it to each of the credit card payment terminal 1130 and the mobile station 1110.

In step 1117, if the credit card payment is completed according to the aforementioned procedure, the credit card company server 1170 transmits the corresponding credit card transaction history of the user to the mobile station 1110 via the WiBro system 1150. In step 1119, the mobile station 1110 updates the electronic passbook stored in its memory, based on the received credit card transaction history, and stores the updated electronic passbook in an image file format.

When the mobile station 1110 uses a SIM card, the electronic passbook may be stored in the SIM card. Steps 1121 to 1125 of FIG. 11 correspond to an additional procedure of authenticating a credit card transaction history, in which the mobile station 1110 transmits final credit card transaction information to the credit card company server 1170 in step 1121, and the credit card company server 1170 transmits an authenticated credit card transaction history to the mobile station 1110 in step 1121 when a result of comparing the credit card transaction history received in step 1121 with the corresponding credit card transaction history of the user, stored in an internal database, shows that both the histories are the same. In step 1125, the mobile station 1110 then stores the authenticated credit card transaction history in the electronic passbook.

As described above, the present invention can provide a wide range of financial services, including a mobile banking service and/or a credit card authentication service in which a mobile station is connected with an ATM/CD and/or a credit card payment terminal, as well as the existing Internet banking service, by using a high-speed packet data system.

Further, the present invention can avoid the inconvenience to a user to directly update a passbook by providing a mobile station with an electronic passbook and updating financial transaction histories in real time.

Further, the present invention enables a user to be conveniently provided with various financial transactions through a mobile station without carrying a bank card, a passbook or a credit card with him/her, and thereby can integrate various financial transactions into the mobile station.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A system for providing a financial service over a mobile communication network that can provide packet data, the system comprising:
    a mobile station for reading a barcode of an automatic machine, transmitting user authentication data and the read barcode to the mobile communication network, receiving passbook data from the mobile communication network, and storing and managing the received passbook data;
    the mobile communication network for receiving from the mobile station the user authentication data and the barcode in a packet data format to thereby provide barcode information to a bank server, determining whether to approve the service by receiving location information of the automatic machine from the bank server, and providing the automatic machine and the bank server with a result of the determination;
    the bank server for managing the passbook data of a user, allocating a specific barcode to each automatic machine, providing the location information of the automatic machine corresponding to the barcode when receiving the barcode information from the mobile communication network, and providing the mobile station with a banking service; and
    the automatic machine for receiving the barcode from the bank server and outputting the received barcode when the banking service through the mobile terminal is requested, and providing the banking service through the bank server when the service is approved.

2. The system as claimed in claim 1, wherein the mobile communication network comprises a wireless communication system employing a Wireless Broadband (WiBro) scheme.

3. The system as claimed in claim 2, wherein the mobile station is authenticated using a privacy key management message and an extensible authentication protocol.

4. The system as claimed in claim 2, wherein the wireless communication system employing the WiBro scheme communicates with the bank server through at least one of message transmission and message reception using a Transmission Control Protocol/Internet Protocol (TCP/IP).

5. The system as claimed in claim 1, wherein the automatic machine comprises a cash dispenser.

6. The system as claimed in claim 1, wherein the automatic machine comprises a credit card reader.

7. A mobile station apparatus for receiving a banking service by using a financial service provided over a mobile communication network that can provide packet data, the apparatus comprising:
    a barcode reader for reading a barcode of an automatic machine;
    a memory for storing banking service information;
    a modem for at least one of modulating data and demodulating data to perform packet communication;
    a radio processor for at least one of transmitting the data and receiving the data over a packet communication channel; and
    a controller for controlling the mobile station apparatus to generate a transmission message by using the barcode information received from the barcode reader and authentication information for the mobile station apparatus and to transmit the generated transmission message to the mobile communication network through the modem and the radio processor when the banking service is received, and for controlling the mobile station apparatus to store in the memory banking service data received through packet data.

8. The apparatus as claimed in claim 7, further comprising a display for displaying resultant data of the banking service, and displaying the banking service information stored in the memory.

9. A method of receiving a banking service by using a financial service provided to a mobile station in a mobile communication network that can provide packet data, the method including the steps of:
    reading barcode information of an automatic machine, and transmitting the read barcode information to the mobile communication network when the banking service is received;

performing the banking service when an approval message is received from the mobile communication network; and receiving and storing banking service data after the banking service is performed.

10. The method as claimed in claim 9, wherein authentication information for the mobile station is transmitted when the barcode information is transmitted.

11. The method as claimed in claim 10, the authentication information is communicated using a privacy key management message and an extensible authentication protocol.

12. The method as claimed in claim 9, wherein further comprising displaying the stored banking service data when a request is made to display the banking service data.

13. A base station apparatus for providing a mobile station with a banking service by using a financial service provided to the mobile station in a mobile communication system that can provide packet data, the apparatus comprising:

a transceiver for performing packet data transmission and reception to and from the mobile station through a predetermined wireless band, and performing packet data transmission and reception to and from a bank server over a wired network; and a controller for authenticating the mobile station by comparing a location of the mobile station with a location of a banking service terminal received from the bank server.

14. The apparatus as claimed in claim 13, wherein the controller authenticates the mobile station when the mobile station is located within a predetermined region.

15. A method of providing a mobile station with a banking service by using a financial service provided to the mobile station in a mobile communication system that can provide packet data, the method comprising the steps of:

transmitting a barcode to a bank server when a message including the barcode of an automatic machine is received from the mobile station;

receiving location information of the automatic machine to which the barcode is allocated, and comparing the location information of the automatic machine with location information of the mobile station; and providing a service approval message to each of the bank server and the mobile station when the location information of the automatic machine corresponds to the location information of the mobile station.

16. The method as claimed in claim 15, further comprising transmitting a service rejection message to the mobile station when the location information of the automatic machine does not correspond to the location information of the mobile station.

17. A bank server apparatus for providing a mobile station with a banking service through communication with a mobile communication network that can provide packet data, the apparatus comprising:

a first interface for transmitting and receiving banking data to and from each bank terminal over a specific network;

a second interface for performing data communication with the mobile communication network;

a barcode storage unit for storing a barcode of each bank terminal;

a passbook data storage unit for storing passbook data of a user; and a controller for providing barcode information to each bank terminal through the first interface, providing location information of each bank terminal corresponding to the barcode information through the second interface when the barcode information is received from the mobile station, and providing the banking service and a result of the service to the mobile station when approval information is received.

18. A method of providing a mobile station with a banking service through communication with a mobile communication network that can provide packet data, the method comprising the steps of:

providing barcode information to a bank terminal when the bank terminal requests the barcode information;

providing location information of the bank terminal corresponding to the barcode information to the mobile communication network when the barcode information is received from the mobile station over the mobile communication network; and providing the banking service through the bank terminal, and providing a result of the service to the mobile station when approval information is received from the mobile communication network.

19. The method as claimed in claim 18, wherein the barcode information is transmitted in real time.

20. A method of providing a financial service over a mobile communication network that can provide packet data, the method comprising the steps of:

transmitting a request for barcode information from a bank terminal to a bank server, and receiving and displaying the barcode information by the bank terminal when a banking service through a barcode is requested;

reading the barcode information to generate authentication information for a mobile station, and providing by the mobile station the bank server with the barcode information and the authentication information over the mobile communication network;

receiving the barcode information, and providing by the bank server the mobile communication network with location information of the bank terminal;

comparing the location information of the bank terminal with location information of the mobile terminal, and transmitting by the mobile communication network a service approval message to the bank server and the mobile station when the location information of the bank terminal corresponds to the location information of the mobile station; and providing the banking service through the bank terminal, and providing the mobile terminal with a result of the banking service through the mobile communication network by the bank server.

21. The method as claimed in claim 20, wherein the bank terminal comprises a cash dispenser.

22. The method as claimed in claim 20, wherein the bank terminal comprises a credit card reader.

* * * * *